US012736210B2

(12) United States Patent
Shinohara et al.

(10) Patent No.: US 12,736,210 B2
(45) Date of Patent: Sep. 15, 2026

(54) DISPLAY SWITCHING DEVICE, SWITCH, AND ELECTRICAL APPARATUS

(71) Applicant: OMRON Corporation, Kyoto (JP)

(72) Inventors: Masayuki Shinohara, Kyoto (JP); Yuto Mori, Kyoto (JP); Gouo Kurata, Kyoto (JP); Yutaka Okayasu, Kyoto (JP); Yasuhito Uetsuji, Kyoto (JP); Hayato Yoshida, Kyoto (JP); Masao Mishina, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 19/139,363

(22) PCT Filed: Dec. 25, 2023

(86) PCT No.: PCT/JP2023/046356

§ 371 (c)(1),
(2) Date: Jun. 15, 2025

(87) PCT Pub. No.: WO2024/161865

PCT Pub. Date: Aug. 8, 2024

(65) Prior Publication Data

US 2026/0210536 A1 Jul. 23, 2026

(30) Foreign Application Priority Data

Jan. 30, 2023 (JP) ................................ 2023-011807

(51) Int. Cl.
*F21V 23/00* (2015.01)
*F21V 5/00* (2018.01)
*F21V 23/04* (2006.01)

(52) U.S. Cl.
CPC .............. *F21V 23/04* (2013.01); *F21V 5/007* (2013.01)

(58) Field of Classification Search
CPC ......... F21V 23/04; F21V 23/007; F21V 5/007
See application file for complete search history.

(56) References Cited

U.S. PATENT DOCUMENTS

| | | | | |
|---|---|---|---|---|
| 12,007,661 | B2 * | 6/2024 | Narabu | G03B 21/2013 |
| 2020/0359484 | A1 * | 11/2020 | Shinohara | G02B 3/005 |
| 2024/0385433 | A1 * | 11/2024 | Kitahara | B60K 35/10 |

FOREIGN PATENT DOCUMENTS

| | | |
|---|---|---|
| JP | 2003195216 | 7/2003 |
| JP | 2009116097 | 5/2009 |
| JP | 2020184013 | 11/2020 |

OTHER PUBLICATIONS

"International Search Report (Form PCT/ISA/210) of PCT/JP2023/046356", mailed on Feb. 13, 2024, with English translation thereof, pp. 1-4.

(Continued)

*Primary Examiner* — Gerald J Sufleta, II
(74) *Attorney, Agent, or Firm* — JCIPRNET

(57) ABSTRACT

Provided is a display switching device readily included in an electrical apparatus having a curved surface, and the like. A display switching device (11) comprises: a lens array and a display unit (43). In at least a part of the lens array, (1) a curved surface of the average surface of light entry surfaces is concave, and a curved surface of the average surface of light exit surfaces is convex, or (2) the curved surface of the average surface of the light entry surfaces is convex and the curved surface of the average surface of the light exit surfaces is concave.

11 Claims, 11 Drawing Sheets

(56) References Cited

OTHER PUBLICATIONS

"Written Opinion of the International Searching Authority (Form PCT/ISA/237) of PCT/JP2023/046356", mailed on Feb. 13, 2024, with English translation thereof, pp. 1-6.

* cited by examiner

DISPLAY SWITCHING DEVICE, SWITCH, AND ELECTRICAL APPARATUS

CROSS-REFERENCE TO RELATED APPLICATION

This application is a 371 application of the International PCT application serial no. PCT/JP2023/046356, filed on Dec. 25, 2023, which claims the priority benefits of Japan Patent Application No. 2023-011807, filed on Jan. 30, 2023. The entirety of each of the above-mentioned patent applications is hereby incorporated by reference herein and made a part of this specification.

TECHNICAL FIELD

The disclosure relates to a display switching device that switches display images, a switch including the display switching device, and an electrical apparatus including the switch.

RELATED ART

Patent Document 1 discloses a backlight display device for automatic visual inspection of a lenticular image card, including an illumination source that selectively illuminate individual images formed on a lenticular medium by design. In the backlight display device, the illumination source of the display directs light through the microlens side of the lenticular image card by adapting to a viewing distance and a selected viewing angle of the card, in order to illuminate sequentially respective images in order.

PRIOR ART DOCUMENTS

Patent Document(s)

[Patent Document 1] Japanese Patent Application Laid-open No. 2003-195216

SUMMARY OF INVENTION

Technical Problem

However, the surface of the device disclosed in Patent Document 1 is planar. Therefore, there is an issue that it is difficult to embed the device into an electrical apparatus having a curved surface.

An aspect of the disclosure aims to realize a display switching device that can be easily embedded into an electrical apparatus having a curved surface.

Means for Solving the Issue

To solve the issue, a display switching device according to an aspect of the disclosure switches a display image by switching irradiation of light from multiple light sources. The display switching device includes: a lens array, in which multiple lenses are arranged; and a display part. The display part includes multiple pixel regions, the pixel regions being disposed to comprise regions through which light condensed by each of the lenses of the lens array passes, a transmittance in each of the pixel regions is set to correspond to a predetermined static pattern, and in at least a portion of the lens array, a mean plane of a light incident surface and a mean plane of a light exit surface are curved surfaces, and (1) the curved surface of the mean plane of the light incident surface is concave, and the curved surface of the mean plane of the light exit surface is convex, or (2) the curved surface of the mean plane of the light incident surface is convex, and the curved surface of the mean plane of the light exit surface is concave.

Inventive Effects

According to an aspect of the disclosure, a display switching device that can be easily embedded into an electrical apparatus having a curved surface can be realized.

DESCRIPTION OF EMBODIMENTS

Hereinafter, an embodiment according to one aspect of the disclosure (also referred to as "the present embodiment") will be described based on the drawings.

§ 1. Application Example

Figure 1:
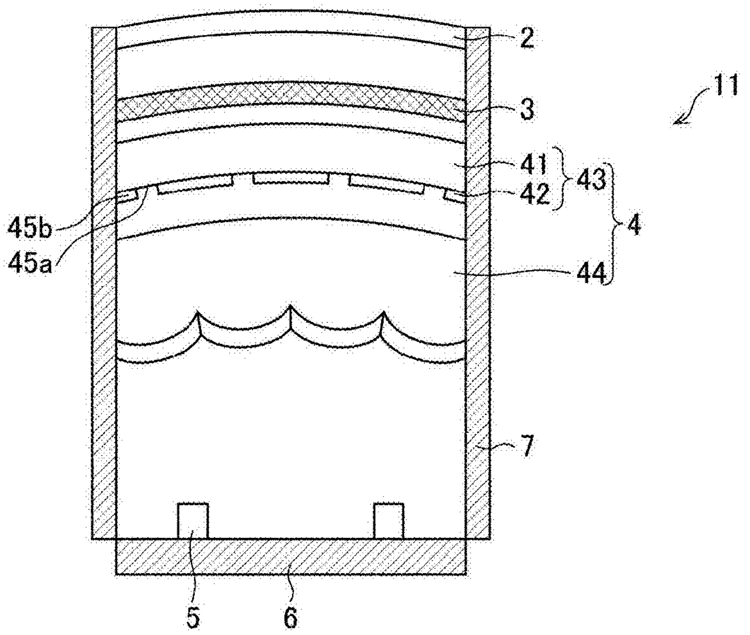
FIG. 1 is a schematic diagram showing a basic configuration of a display switching device according to an application example of the disclosure.

FIG. 1 is a schematic diagram showing a basic configuration of a display switching device 11 according to the application example. As shown in FIG. 1, the display switching device 11 includes, in the order from top to bottom in the drawing, a light absorption member 2, a light diffusion member 3, a display light condensation part 4, multiple light sources 5, and a substrate 6.

In the following, as an example, a case where the display switching device 11 is applied as a keytop of a keyboard for text input will be described. The size of each component described below shows examples suitable for the application as a keytop.

The light absorption member 2 is square when viewed in a top view, with a side length of 14 mm. In addition, four light sources 5 are provided, preferably RGB LEDs, with a distance of 8 mm between adjacent light sources 5. However, the display switching device 11 may not include the light sources 5 if necessary. In such case, the user needs to prepare the light sources.

As an example, the light absorption member 2 is formed by a tinted material, with a thickness of 1 mm. The transmittance of the light absorption member 2 may be, for example, 20%.

The light diffusion member 3 provided below the light absorption member 2 has a thickness of 0.1 mm, and may have a haze value of 90%. Details of the light absorption member 2 and the light diffusion member 3 will be described later.

The display light condensation part 4 includes a display part 43 and a microlens array (hereinafter abbreviated as lens array) 44. The display part 43 includes an image layer 41 and a matrix layer 42, and displays an image (display image) P to be displayed. The image layer 41 has a thickness of 0.1 mm. The matrix layer 42 includes, for example, pixel regions 45*a* (openings, the same applies hereinafter) and pixel surrounding regions 45*b* (masks, the same applies hereinafter) which are regions other than the pixel regions 45*a*. The image layer 41 and the matrix layer 42 are bonded together. Here, the "pixel surrounding region 45*b*" refers to a region around each pixel region 45*a* and has a constant transmittance. Also, the pixel surrounding region 45*b* blocks the light from the light source side, that is, light from the side where the lens array 44 is disposed.

The lens array 44 provided below the display part 43 condenses light emitted from multiple light sources 5 attached to the substrate 6. The thickness is 0.4 mm. The lens array 44 is configured with multiple lenses arranged in an array.

The display part 43 includes multiple pixel regions 45*a*. The pixel regions 45*a* are regions disposed to include regions where light emitted from the positions of multiple light sources 5 and condensed by respective lenses of the lens array 44 passes through. The transmittance in each pixel region 45*a* is set to correspond to a predetermined static pattern.

The light absorption member 2, the light diffusion member 3, the display part 43, and the lens array 44 are supported by a chassis 7. Furthermore, the basic configuration of the display switching device 11 is made by attaching the chassis 7 to the substrate 6 to which the light sources 5 are attached. Also, the display switching device 11 may include a protective layer for damage prevention above the light absorption member 2. Details of the substrate 6 and the chassis 7 will be described later. Also, the distance from the upper end of the light source 5 to the lower end of the lens array 44 is 20 mm.

In the display switching device 11 having the configuration described above, the display image P is switched by switching the light irradiation from the positions of the light sources 5. The switching of ON/OFF of the light sources 5 is performed by a light source control part (not shown). The light source control part is configured, for example, with an IC chip provided on a substrate in the keyboard, and light source control is performed based on an instruction from, for example, the PC body.

Figure 2B:
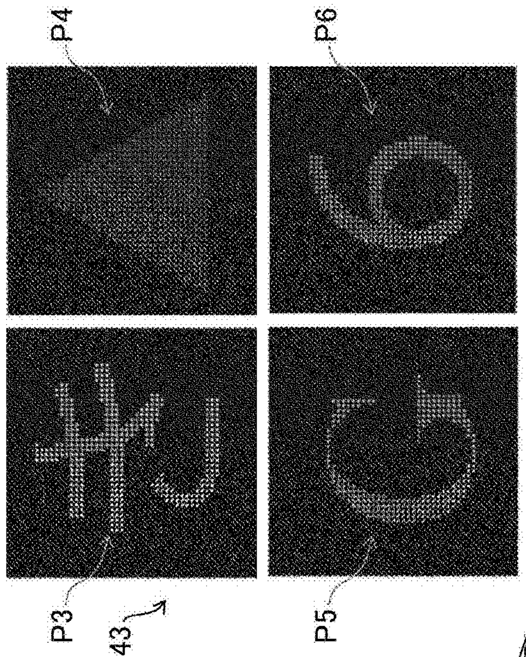
FIGS. 2A to 2D are diagrams showing switching display examples of a display part in FIG. 1.
Figure 2D:
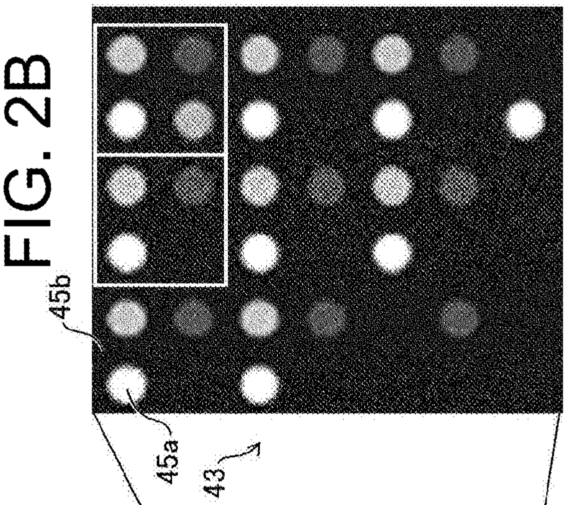
Figure 2A:
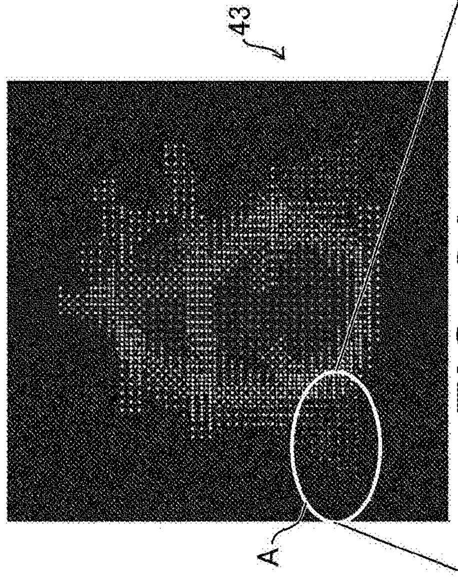
Figure 2C:
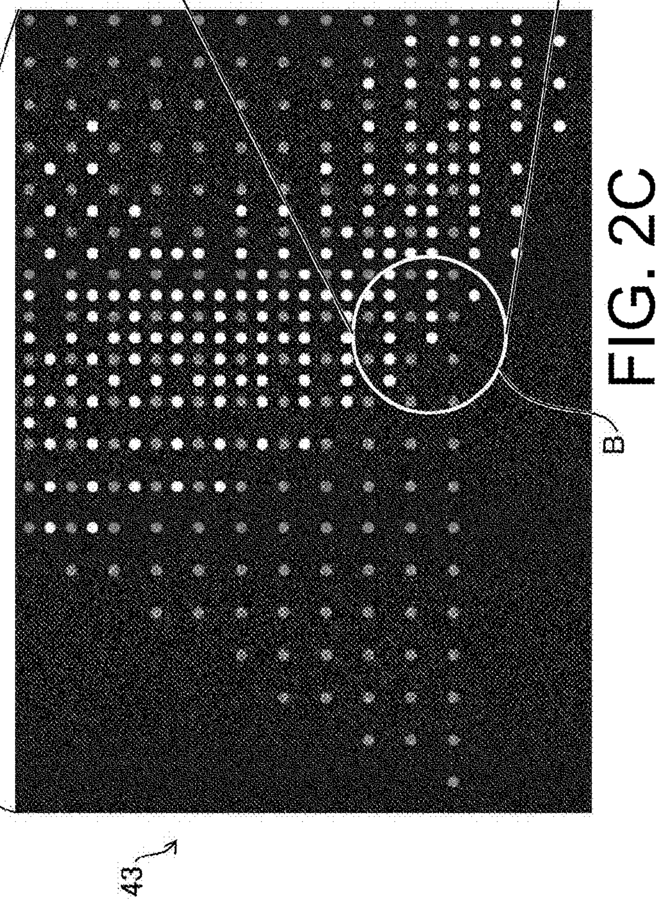

FIGS. 2A to 2D are diagrams showing switching display examples of the display part 43. FIG. 2A shows a display example displayed on the display part 43 (image layer 41), FIG. 2B shows an example of a pattern to be displayed, FIG. 2C is an enlarged view of a portion A of FIG. 2A, and FIG. 2D is an enlarged view of a portion B of FIG. 2C.

In the display example shown in FIGS. 2A to 2D, it is possible to switch and display, for example, on the same image layer, a third image P3 (in the example, a Japanese hiragana "き"), a fourth image P4 (in the example, the pattern "Δ"), a fifth image P5 (in the example, the uppercase alphabet "G"), and a sixth image P6 (in the example, the number "6").

As shown in FIG. 2D, as an example, it is possible to divide the entire display part 43 into multiple regions (multiple pixels), each including up to four pixel regions 45*a* in one region, and switch the display.

Here, as an example, the pitch between adjacent regions is approximately 200 μm, the distance between adjacent pixel regions 45*a* within the same region is approximately 100 μm, and the diameter of multiple pixel regions 45*a* is 30 μm to 80 μm. Also, as shown in FIG. 2D, the regions of the display part 43 other than the pixel regions 45*a* are pixel surrounding regions 45*b*.

Figure 3:
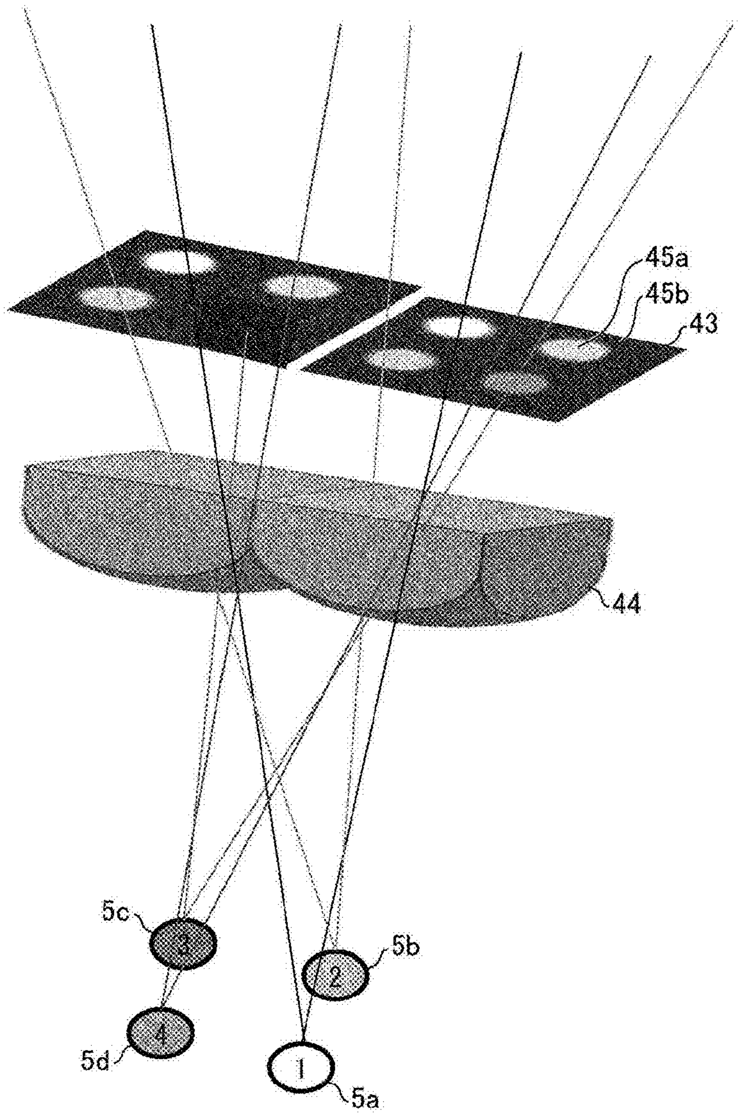
FIG. 3 is a diagram showing a correspondence relationship among the display part, lenses forming a microlens array, and a light source in FIG. 1.

FIG. 3 is a diagram showing a correspondence relationship among the display part 43, the lenses forming the microlens array 44, and the light sources 5. Light sources 5*a* to 5*d* shown in FIG. 3 are, for example, light sources that emit white light, green light, red light, and blue light, respectively.

In FIG. 3, two pixels are exemplified, and light from each light source is condensed by the lens array 44 and exits from the corresponding pixel region 45*a*. The respective pixels are divided into the respective pixel regions 45*a* and pixel surrounding regions 45*b*.

§ 2 Configuration Example

Figure 4:
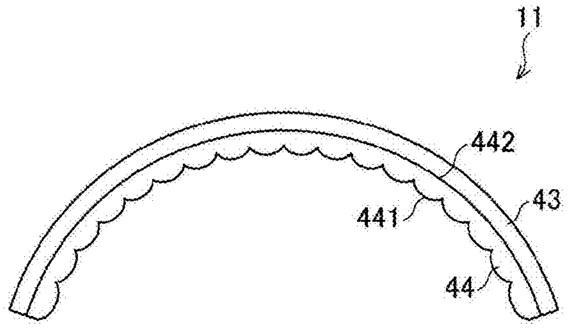
FIG. 4 is a diagram showing a configuration of main components of a display switching device according to a configuration example of the disclosure.

FIG. 4 is a diagram showing a configuration of main components of the display switching device 11 according to a configuration example of the disclosure. As shown in FIG. 4, the display switching device 11 includes the display part 43 and the lens array 44. In addition, the display switching device 11 may further include the light absorption member 2, the light diffusion member 3, the display light condensation part 4, the light sources 5, and the substrate 6, as shown in FIG. 1.

The lens array 44 has a light incident surface 441 and a light exit surface 442. In the configuration example, multiple lenses are formed on the side of the light incident surface 441 in the lens array 44. However, in the display switching device according to the disclosure, multiple lenses may be formed on the side of the light exit surface 442.

At each of the light incident surface 441 and the light exit surface 442, a surface approximated as a plane or a curved surface is referred to as a mean plane. In at least a portion of the lens array 44, the mean plane of the light incident surface 441 and the mean plane of the light exit surface 442 are curved surfaces. In FIG. 4, throughout the entire lens array 44, the mean plane of the light incident surface 441 and the mean plane of the light exit surface 442 are curved surfaces.

In the display switching device 11 according to the disclosure, in the example shown in FIG. 4, the curved surface of the mean plane of the light incident surface 441 is concave, and the curved surface of the mean plane of the light exit surface 442 is convex. In addition, as described later, the curved surface of the mean plane of the light incident surface 441 may be convex, and the curved surface of the mean plane of the light exit surface 442 may be concave. In the specification, "concave" means that the surface is recessed backward when the direction from the surface of the lens array 44 toward the outside of the lens array 44 is defined as forward. Also, in the specification, "convex" means that the surface is protruding forward when the direction from the surface of the lens array 44 toward the outside of the lens array 44 is defined as forward. With such shape, since the directions in which the surfaces are curved are the same for the light incident surface 441 and the light exit surface 442, the volume of the lens array 44 can be reduced. Therefore, it is possible to achieve reduction in component cost and weight of the display switching device 11.

As shown in FIG. 4, in the lens array 44, the curved surface of the mean plane of the light incident surface 441 is concave. Also, the curved surface of the mean plane of the light exit surface 442 is convex. This makes it possible to reduce variations in the distance between the light source 5 (see FIG. 1, etc.) and each position on the mean plane of the light incident surface 441. Therefore, it is possible to make the light condensation performance of each lens in the lens array 44 more uniform, as well as to make the amount of light emitted from each lens more uniform.

In the lens array 44, the curvature of the curved surface of the mean plane of the light incident surface 441 and the curvature of the curved surface of the mean plane of the light exit surface 442 may differ depending on the position. For example, the lens array 44 with a planar shape may also have a bent shape. In such case, the curvature at the bent portion is locally large, and the curvature of other planar portions is 0. Also, in this case, the display part 43 may also have a shape that follows the bent lens array 44. The bent portion may have a structure where no lens in the lens array 44 and no pixel region in the display part 43 are formed.

In the configuration example, the curved surface of the mean plane of the light incident surface 441 and the curved surface of the mean plane of the light exit surface 442 have a curvature greater than 0 in a first direction along the curved surface. Also, the curved surface of the mean plane of the light incident surface 441 and the curved surface of the mean plane of the light exit surface 442 have a curvature of 0 in the second direction along the curved surface, which is different from the first direction. In FIG. 4, the direction perpendicular to the paper surface is the second direction. This allows the display switching device 11 to perform display on a surface that has a curvature in only one direction.

The lens array 44 may be formed by injection molding using a mold that forms the molded product into the shape. Alternatively, the lens array 44 may be formed by bending a lens array formed by injection molding using a mold that forms the light incident surface 441 and the light exit surface 442 of the molded product as planar surfaces.

Figure 5:
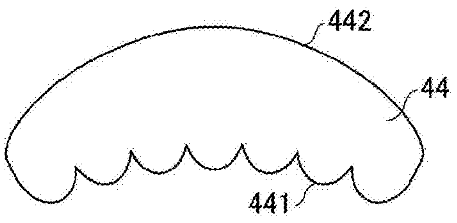
FIG. 5 is a diagram showing the curvature in each of a curved surface of a mean plane of a light incident surface and a curved surface of a mean plane of a light exit surface.

FIG. 5 is a diagram showing the curvature in each of the curved surface of the mean plane of the light incident surface 441 and the curvature of the curved surface of the mean plane of the light exit surface. In the example shown in FIG. 5, the curvature of the curved surface of the mean plane of the light exit surface 442 is greater than the curvature of the curved surface of the mean plane of the light incident surface 441.

In the case where multiple lenses are formed on the side of the light incident surface 441, if the curvature of the curved surface of the mean plane of the light incident surface 441 is made too large, it may become difficult to remove the mold of the light incident surface 441 when forming the lens array 44 by injection molding. With the lens array 44 having the shape shown in FIG. 5, even in the case where it is desirable to increase the curvature of the curved surface of the mean plane of the light incident surface 441, it is possible to limit the curvature to a degree that allows for mold removal from the lens array 44.

Figure 6:
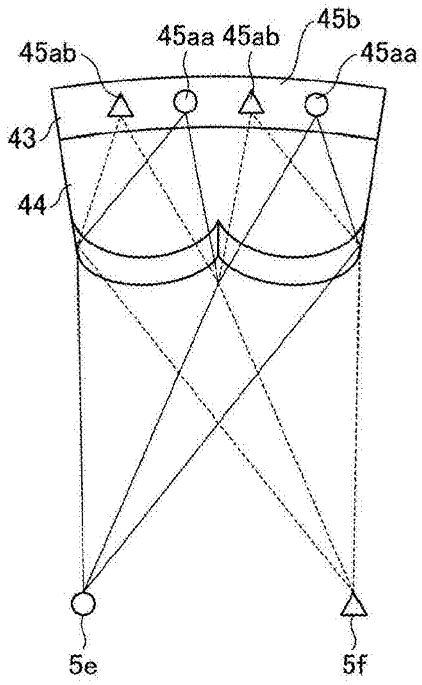
FIG. 6 is a diagram showing an operation of a display switching device according to a configuration example of the disclosure.

FIG. 6 is a diagram showing the operation of the display switching device 11. In FIG. 6, in addition to the display part 43 and the lens array 44 included in the display switching device 11, light sources 5*e*, 5*f* as the light source 5 are shown. Also, in FIG. 6, pixel regions 45*aa*, 45*ab* are shown as the pixel region 45*a*. The pixel regions 45*aa*, 45*ab* are each pixel regions 45*a* for displaying images different from each other.

The light emitted from the light source 5*e* is condensed by the lens array 44 onto each pixel region 45*aa*. The light emitted from the light source 5*f* is condensed by the lens array 44 onto each pixel region 45*ab*, which is different from the pixel region 45*aa*. Therefore, according to the display switching device 11, by switching the light source that emits light, the displayed image can be switched.

Figure 7:
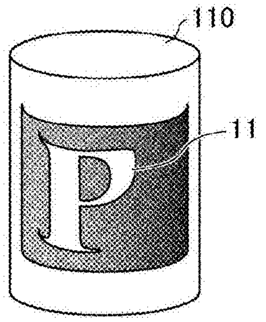
FIG. 7 is a diagram showing an example of a switch including a display switching device according to a configuration example of the disclosure.

FIG. 7 is a diagram showing an example of a switch 110 including the display switching device 11. In the example shown in FIG. 7, as the switch 110, a device having a cylindrical shape is assumed. The device performs a switching operation through an operation such as pushing down in the axial direction or rotating around the axis. The side surface of the cylindrical shape is an example of a surface having a curvature in only one direction. The display switching device 11 may be provided on the side surface of the cylindrical shape of the switch 110, or may be provided as a display part on the side surface of a cylindrical member.

§ 3 Modification Example

<3.1>

Figure 8:
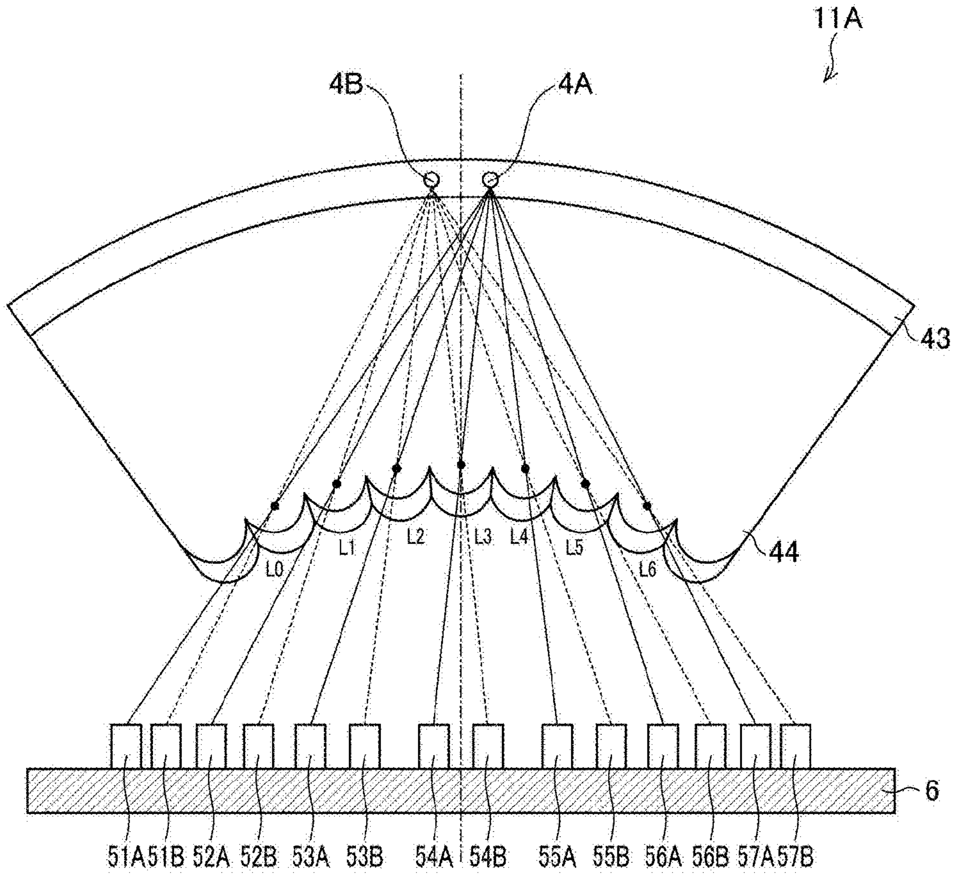
FIG. 8 is a diagram showing the configuration of main components of a display switching device according to a first modification example of the disclosure.

FIG. 8 is a diagram showing the configuration of main components of a display switching device 11A according to a first modification example of the disclosure. As shown in FIG. 8, the display switching device 11A includes the display part 43 and the lens array 44 same as those of the display switching device 11. In FIG. 8, the lens array 44 includes microlenses L0 to L6.

The display switching device 11A includes light sources 51A to 57A belonging to a first light source group and light sources 51B to 57B belonging to a second light source group, as the light sources 5. Also, the display switching device 11A includes a first pixel region group including a pixel region 4A (first pixel region) and a second pixel region group including a pixel region 4B (second pixel region) as pixel regions.

In the display switching device 11A shown in FIG. 8, the light emitted from the light source 51A belonging to the first light source group is irradiated onto the pixel region 4A included in the first pixel region group after being condensed by the microlens L0 of the lens array 44. In addition, the light emitted from the light source 52A belonging to the first light source group is irradiated onto the pixel region 4A after being condensed by the microlens L1 of the lens array 44. In addition, the light emitted from the light source 53A belonging to the first light source group is irradiated onto the pixel region 4A after being condensed by the microlens L2 of the lens array 44. In addition, the light emitted from the light source 54A belonging to the first light source group is irradiated onto the pixel region 4A after being condensed by the microlens L3 of the lens array 44. In addition, the light emitted from the light source 55A belonging to the first light source group is irradiated onto the pixel region 4A after being condensed by the microlens L4 of the lens array 44. In addition, the light emitted from the light source 56A belonging to the first light source group is irradiated onto the pixel region 4A after being condensed by the microlens L5 of the lens array 44. In addition, the light emitted from the light source 57A belonging to the first light source group is irradiated onto the pixel region 4A after being condensed by the microlens L6 of the lens array 44. In the embodiment, the case where light from seven different light sources 51A to 57A is irradiated onto the pixel region 4A through different microlenses L0 to L6 is described as an example, but the disclosure is not limited thereto.

Likewise, in the display switching device 11A shown in FIG. 8, the light emitted from the light source 51B belonging to the second light source group is irradiated onto the pixel region 4B included in the second pixel region group after being condensed by the microlens L0 of the lens array 44. In addition, the light emitted from the light source 52B belonging to the second light source group is irradiated onto the pixel region 4B after being condensed by the microlens L1 of the lens array 44. In addition, the light emitted from the light source 53B belonging to the second light source group is irradiated onto the pixel region 4B after being condensed by the microlens L2 of the lens array 44. In addition, the light emitted from the light source 54B belonging to the second light source group is irradiated onto the pixel region 4B after being condensed by the microlens L3 of the lens array 44. In addition, the light emitted from the light source 55B belonging to the second light source group is irradiated onto the pixel region 4B after being condensed by the microlens LA of the lens array 44. In addition, the light emitted from the light source 56B belonging to the second light source group is irradiated onto the pixel region 4B after being condensed by the microlens L5 of the lens array 44. In addition, the light emitted from the light source 57B belonging to the second light source group is irradiated onto the pixel region 4B after being condensed by the microlens L6 of the lens array 44. In the embodiment, the case where light from seven different light sources 5BA to 57B is irradiated onto the pixel region 4B through different microlenses L0 to L6 is described as an example, but the disclosure is not limited thereto.

According to the display switching device 11A, the uniformity of display in each of the pixel region 4A (first pixel region) and the pixel region 4B (second pixel region) can be improved. Furthermore, the uniformity of brightness between the pixel region 4A (first pixel region) and the pixel region 4B (second pixel region) can also be improved. Therefore, enlargement and thinning of the display switching device 11A becomes possible.

As shown in FIG. 8, the light source 51A belonging to the first light source group and the light source 51B belonging to the second light source group are disposed within the first arrangement region. Also, the light source 52A belonging to the second light source group and the light source 52B belonging to the second light source group are arranged within the second arrangement region. The first arrangement region and the second arrangement region are adjacent to each other. The same applies to the light sources 53A to 57A belonging to the first light source group and the light sources 53B to 57B belonging to the second light source group.

In the display switching device 11A, in order to appear bright from a specific angle, for example, only the light sources 56A to 57A belonging to the first light source group and the light sources 56B to 57B belonging to the second light source group, or only the light sources 51A to 52A belonging to the first light source group and the light sources 51B to 52B belonging to the second light source group may be illuminated. Furthermore, in order to appear bright from a specific angle, for example, only the light sources 56A to 57A belonging to the first light source group and the light sources 56B to 57B belonging to the second light source group, or only the light sources 51A to 52A belonging to the first light source group and the light sources 51B to 52B belonging to the second light source group may be provided on the substrate 6.

<3.2>

Figure 9:
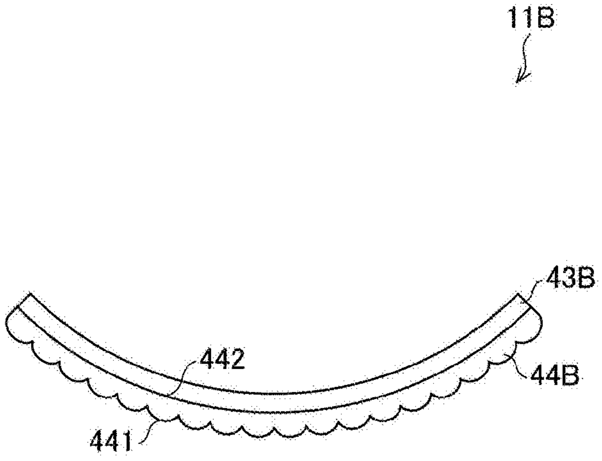
FIG. 9 is a diagram showing the configuration of main components of a display switching device according to a second modification example of the disclosure.

FIG. 9 is a diagram showing the configuration of main components of a display switching device 11B according to a second modification example of the disclosure. As shown in FIG. 9, the display switching device 11B includes a display part 43B and a lens array 44B. Also, the display switching device 11B may further include the light absorption member 2, the light diffusion member 3, the display light condensation part 4, the light sources 5, and the substrate 6, similar to the display switching device 11. The display unit 43B has the same configuration as the display unit 43 except that the display unit 43B has a shape that follows the lens array 44B.

As shown in FIG. 9, in the lens array 44B, multiple lenses are formed on the side of the light incident surface 441. Furthermore, in the lens array 44B, the curved surface of the mean plane of the light incident surface 441 is convex, and the curved surface of the mean plane of the light exit surface 442 is concave. The display unit 43B differs from the display unit 43 only in that the display unit 43B has a shape that follows the lens array 44B.

In the display switching device 11B, by having the lens array 44B with the shape, it is possible to reduce the variation in distance between the user viewing the display switching device 11B and each position on the curved surface of the mean plane of the light exit surface 442 of the lens array 44B. Therefore, the display content at any position of the display unit 43B becomes easier to view.

Also, a push button pressed by the user of the device and including the display switching device 11B may have a concave pressing surface, considering the tactile sensation at the time of pressing. The display switching device 11B is applicable to such push button.

<3.3>

Figure 10:
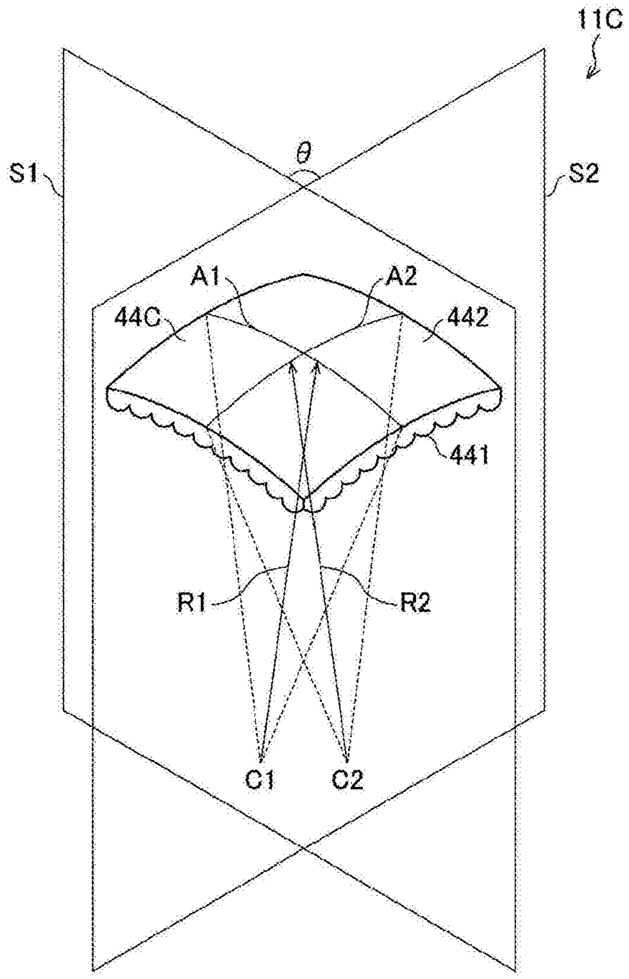
FIG. 10 is a diagram showing the configuration of main components of a display switching device according to a third modification example of the disclosure.

FIG. 10 is a diagram showing the configuration of main components of a display switching device 11C according to a third modification example of the disclosure. As shown in FIG. 10, the display switching device 11C includes a lens array 44C. Also, the display switching device 11C includes a display unit (not shown) having a shape that follows the light exit surface 442 of the lens array 44C. The display switching device 11C may further include the light absorption member 2, the light diffusion member 3, the display light condensation part 4, the light sources 5, and the substrate 6, similar to the display switching device 11.

In FIG. 10, a curve A1 is a curve along the first direction in the mean plane of the light incident surface 441 and the mean plane of the light exit surface 442 of the lens array 44C. Also, a curve A2 is a curve along the second direction in the mean plane of the light incident surface 441 and the mean plane of the light exit surface 442 of the lens array 44C.

As shown in FIG. 10, in the lens array 44C, the curved surface of the mean plane of the light incident surface 441 and the curved surface of the mean plane of the light exit surface 442 have a curvature greater than 0 in the first direction along the curved surface. Also, the curved surface of the mean plane of the light incident surface 441 and the curved surface of the mean plane of the light exit surface 442 have a curvature greater than 0 in the second direction along the curved surface, which is different from the first direction. With the lens array 44C having such shape, the display switching device 11C can perform display on a surface having curvatures in two directions.

In the example shown in FIG. 10, a curvature center C1 in the first direction and a curvature center C2 in the second direction are both present on the side of the light incident surface 441 with respect to the lens array 44C. The radius of curvature of the lens array 44C in the first direction is R1, and the radius of curvature of the lens array 44C in the second direction is R2. That is, the curvature of the lens array 44C in the first direction is 1/R1, and the curvature of the lens array 44C in the second direction is 1/R2. The values of R1 and R2 may be identical to each other or may differ from each other.

In FIG. 10, a surface S1 is a plane including the curve A1. Also, a surface S2 is a plane including the curve A2. An angle θ formed by the surface S1 and the surface S2 may be 90°, or may be an angle different from 90°. However, in the case where the angle θ is 90°, processing and evaluation of the lens array 44C becomes easier.

Figure 11:
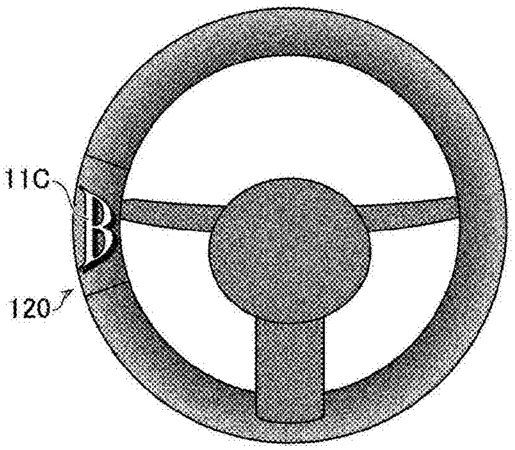
FIG. 11 is a diagram showing an example of a switch including a display switching device according to the third modification example of the disclosure.

FIG. 11 is a diagram showing an example of a switch 120 including a display switching device 11C. In the example shown in FIG. 11, the switch 120 is provided on a portion of a steering wheel of an automobile. Therefore, the switch 120 has a portion with a shape of a bent cylinder. The side surface of the portion with the shape of a bent cylinder is an example of the surface having curvatures in two directions. The display switching device 11C may be provided on a button-shaped switch 120 provided on a portion of the steering wheel, or may be provided as a display part provided on a portion of the steering wheel.

Figure 12:
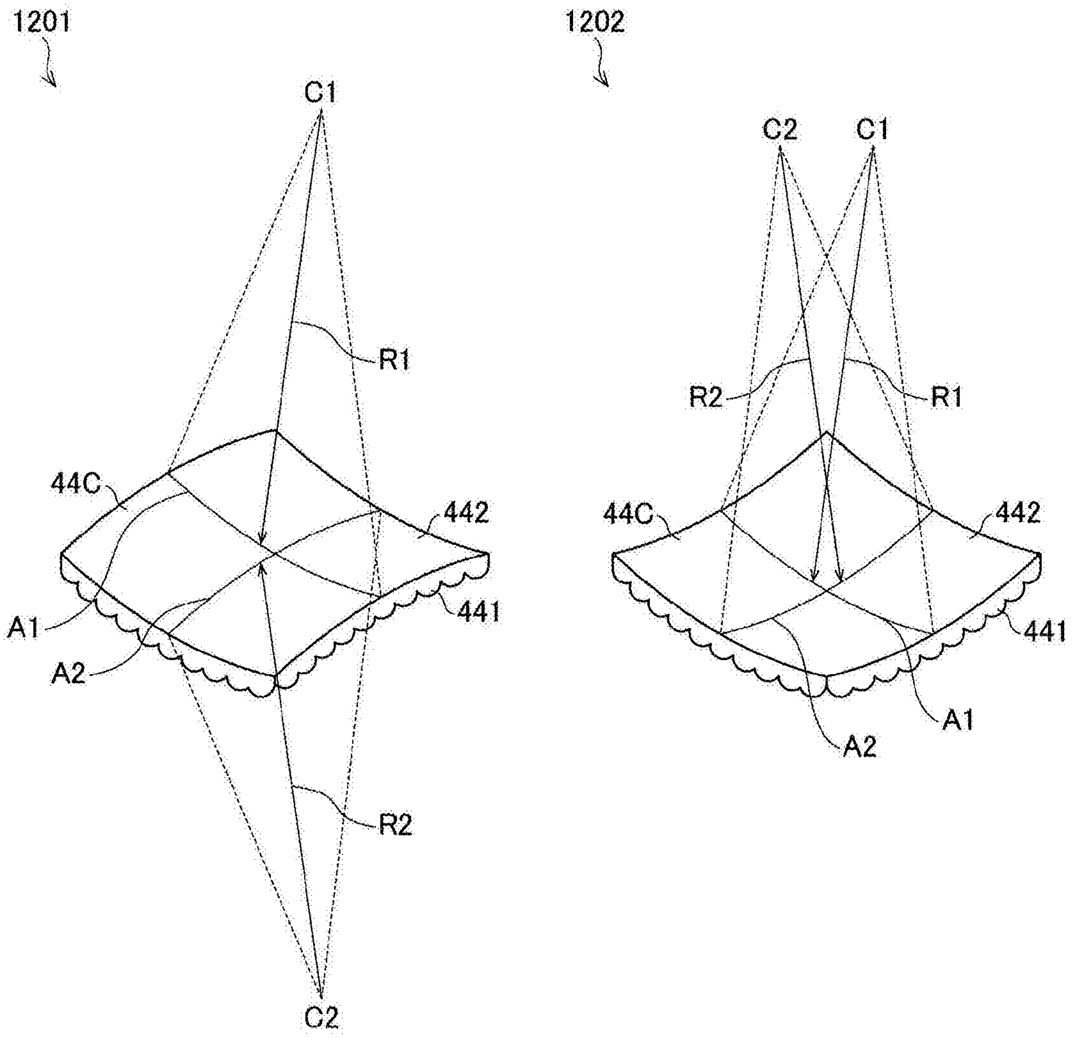
FIG. 12 is a perspective view showing an example of a shape of a lens array included in the display switching device according to the third modification example of the disclosure, which is different from the example shown in FIG. 10.

FIG. 12 is a perspective view showing an example of a shape of the lens array 44C having a shape different from FIG. 10. In FIG. 12, a reference numeral 1201 and a reference numeral 1202 are diagrams showing different examples of the shape of the lens array 44C.

In the example shown by the reference numeral 1201, the curvature center C1 of the lens array 44C in the first direction is positioned on the side of the light exit surface 442 with respect to the lens array 44C. On the other hand, the curvature center C2 of the lens array 44C in the second direction is positioned on the side of the light incident surface 441 with respect to the lens array 44C. In the example shown by the reference numeral 1202, the curvature center C1 of the lens array 44C in the first direction and the curvature center C2 of the lens array 44C in the second direction are both positioned on the side of the light exit surface 442 with respect to the lens array 44C. The lens array 44C having the shapes shown by reference numerals 1201 and 1202 can also perform display on a surface having curvatures in two directions corresponding to the respective shapes.

<3.4>

Figure 13:
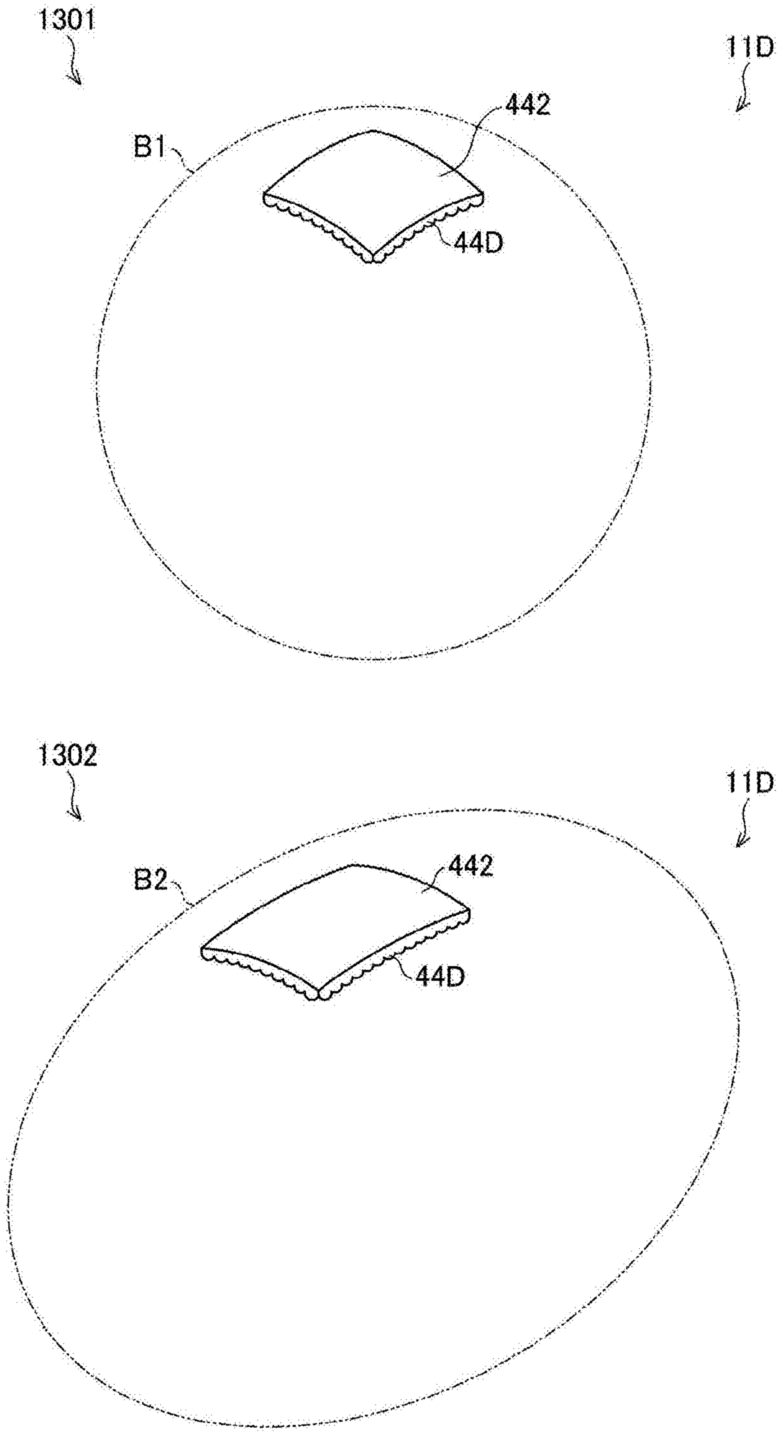
FIG. 13 is a diagram showing the configuration of main components of a display switching device according to a fourth modification example of the disclosure.

FIG. 13 is a diagram showing the configuration of main components of a display switching device 11D according to a fourth modification example of the disclosure. As shown in FIG. 13, the display switching device 11C includes a lens array 44D. Also, the display switching device 11D includes a display unit (not shown) having a shape that follows the light exit surface 442 of the lens array 44D. The display switching device 11D may further include the light absorption member 2, the light diffusion member 3, the display light condensation part 4, the light sources 5, and the substrate 6, similar to the display switching device 11. In FIG. 13, a reference numeral 1301 and a reference numeral 1302 show different examples of the shape of the lens array 44D.

In the example shown by a reference numeral 1301 in FIG. 13, the curved surface of the mean plane of the light exit surface 442 of the lens array 44D includes a portion of a virtual spherical surface B1. In the example shown by a reference numeral 1302 in FIG. 13, the curved surface of the mean plane of the light exit surface 442 of the lens array 44D includes a portion of a virtual ellipsoidal surface B2. In this way, in the display switching device 11D, the curved surface of the mean plane of the light exit surface 442 includes a portion of the spherical surface B1 or the ellipsoidal surface B2. According to the display switching device 11D, display can be performed on a spherical surface or an ellipsoidal surface.

Figure 14:
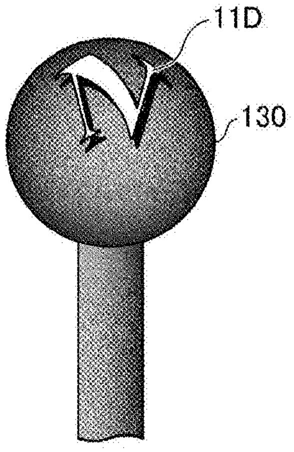
FIG. 14 is a diagram showing an example of a switch including a display switching device according to the fourth modification example of the disclosure.

FIG. 14 is a diagram showing an example of a switch 130 including a display switching device 11D. The switch 130 has a lever-like shape with a spherical portion at the tip. The display switching device 11D is provided on the surface of the spherical portion provided at the switch 130.

<3.5>

Figure 15:
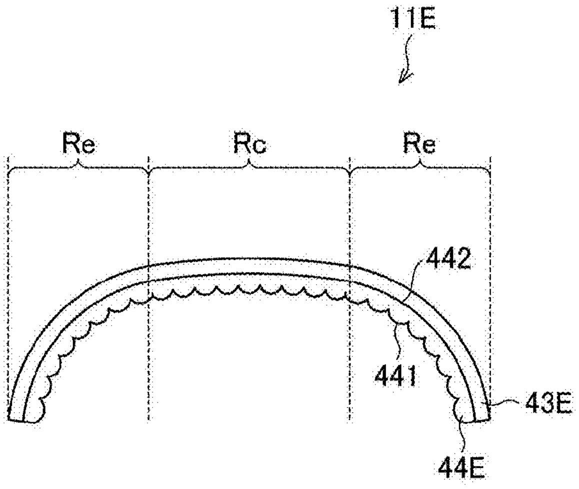
FIG. 15 is a diagram showing the configuration of main components of a display switching device according to a fifth modification example of the disclosure.

FIG. 15 is a diagram showing the configuration of main components of a display switching device 11E according to a fifth modification example of the disclosure. As shown in FIG. 15, the display switching device 11E includes a display part 43E and a lens array 44E. Also, the display switching device 11E may further include the light absorption member 2, the light diffusion member 3, the display light condensation part 4, the light sources 5, and the substrate 6, similar to the display switching device 11. The display unit 43E has the same configuration as the display unit 43 except that the display unit 43E has a shape that follows the lens array 44E.

As shown in FIG. 15, the lens array 44E has a central region Rc and an outer edge region Re. The central region Rc is a region including the center of the curved surface of the mean plane of the light exit surface 442 of the lens array 44E. The outer edge region Re is a region arranged around the central region Rc.

In the curved surface of the mean plane of the light exit surface 442 of the lens array 44E, the curvature of the outer edge region Re is greater than the curvature of the central region Rc. According to the display switching device 11E, display can be performed on a surface with a shape such as a button, where the curvature is small in the central region Rc and the curvature becomes larger in the outer edge region Re.

Also, in the lens array 44E, due to the greater curvature in the outer edge region Re, the amount of light emitted at a larger angle with respect to the direction of the optical axis of light emitted from the curved surface of the outer edge region Re can be increased. Therefore, according to the display switching device 11E, visibility from a wider viewing angle can be improved.

<3.6>

Figure 16:
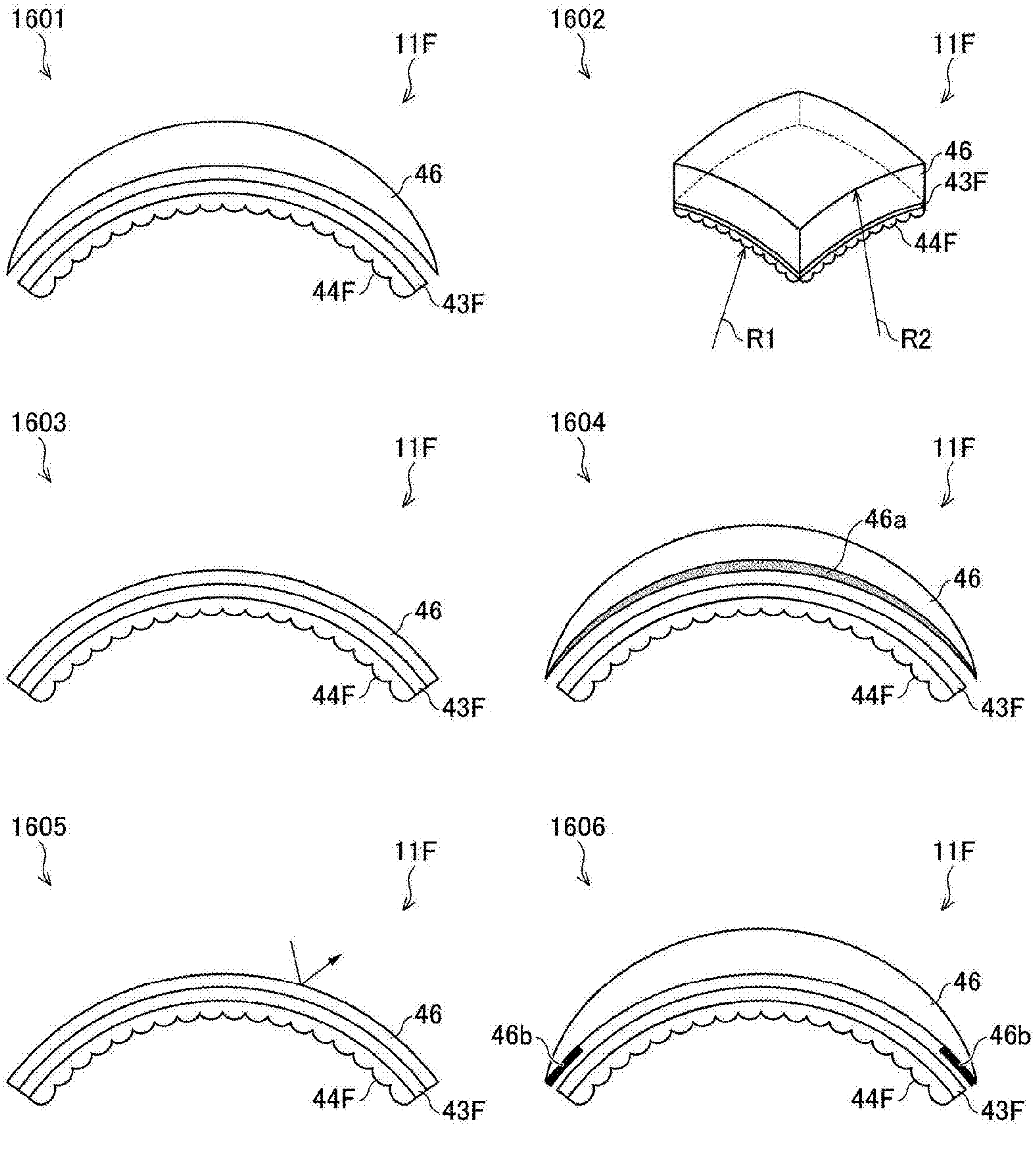
FIG. 16 is a diagram showing the configuration of main components of a display switching device according to a sixth modification example of the disclosure.

FIG. 16 is a diagram showing the configuration of main components of a display switching device 11F according to a sixth modification example of the disclosure. As shown in FIG. 16, the display switching device 11F includes a display part 43F, a lens array 44F, and a transparent member layer 46. Also, the display switching device 11F may further include the light absorption member 2, the light diffusion member 3, the display light condensation part 4, the light sources 5, and the substrate 6, similar to the display switching device 11. In FIG. 16, six types of examples of the display switching device 11F with mutually different structures of the transparent member layer 46 are shown with reference numerals 1601 to 1606.

The display switching device 11F differs from the display switching device 11 in that the display switching device 11F includes a transparent member layer 46 on the light exit side of the lens array 44F. The transparent member layer 46 is a layer formed of a transparent material. As the material for the transparent member layer 46, resin or glass having light transmissivity can be used without particular limitation.

The transparent member layer 46 may be in contact with the lens array 44F, or a gap may be present between the transparent member layer 46 and the lens array 44F. Also, in the case where a gap is present between the transparent member layer 46 and the lens array 44F, the gap may be filled with an adhesive, etc.

In the example shown by a reference numeral 1601, the configuration of the display part 43F and the lens array 44F is the same as the configuration of the display part 43 and the lens array 44 in the display switching device 11. The transparent member layer 46 has a shape with different thicknesses depending on the position. In the example indicated by the reference numeral 1601, the transparent member layer 46 is thick near the center of the lens array 44F and becomes thinner toward the outer edge of the lens array 44F. However, the thickness of the transparent member layer 46 according to position is not limited to this.

In the example shown by a reference numeral 1602, the configuration of the lens array 44F is the same as the configuration of the lens array 44C in the display switching device 11C. The configuration of the display part 43F is the same as the configuration of the display part 43, except that the display part 43F has a shape that follows the surface on the light exit side of the lens array 44F. The transparent member layer 46 has a shape with different thicknesses depending on the position. In the example indicated by the reference numeral 1602, the transparent member layer 46 is thick near the center of the lens array 44F and becomes thinner toward the outer edge of the lens array 44F. However, the thickness of the transparent member layer 46 according to position is not limited to this.

In the examples shown by the reference numerals 1601 and 1602, since it is possible to provide the transparent member layer 46 with a curved surface shape different from the curved surface shape of the light exit surface 442 of the lens array 44F, the degree of freedom of the curved surface shape of the surface from which light is emitted as the display switching device 11F can be improved. Therefore, for example, even in the case where there is an upper limit on the curvature of the curved surface of the light exit surface 442 due to structural reasons for lens formation, it becomes possible to provide a display switching device in which the surface from which light is emitted has a larger curvature.

In the example shown by a reference numeral 1603, the configuration of the display part 43F and the lens array 44F is the same as the configuration of the display part 43 and the lens array 44 in the display switching device 11. The transparent member layer 46 is colored or has the light transmittance adjusted. Specifically, a coloring agent or an additive that changes the transmittance of light is added to the transparent member layer 46. Accordingly, the design quality of the display switching device 11F and the switch, etc., that includes the display switching device 11F is improved. Also, in the example shown by a reference numeral 1603, the transparent member layer 46 has a constant thickness regardless of the position.

In the example shown by a reference numeral 1604, the configuration of the display part 43F and the lens array 44F is the same as the configuration of the display part 43 and the lens array 44 in the display switching device 11. The transparent member layer 46 has a diffusion layer 46*a* that diffuses light on the surface on the light incident side. The diffusion layer 46*a* may be a diffusion sheet that diffuses light, a layer printed with ink that diffuses light, or a structure that diffuses light. Accordingly, the viewing angle properties of the display switching device 11F are improved.

In the example shown by a reference numeral 1605, the configuration of the display part 43F and the lens array 44F is the same as the configuration of the display part 43 and the lens array 44 in the display switching device 11. The transparent member layer 46 includes a reflectivity adjustment layer that adjusts the reflectivity of light. The reflectivity adjustment layer may be a transparent or opaque color layer, or a half-mirror layer.

In the example shown by a reference numeral 1606, the configuration of the display part 43F and the lens array 44F is the same as the configuration of the display part 43 and the lens array 44 in the display switching device 11. The transparent member layer 46 has a light shielding layer 46*b* that blocks light on a portion of the surface on the light incident side. The light shielding layer 46*b* can shield unintentionally emitted light from the display switching device 11F. At a reference numeral 1606, the light shielding layer 46*b* is located near the end part of the transparent member layer 46. Therefore, the light shielding layer 46*b* can shield unintentionally emitted light from the end of the display switching device 11F. However, the position of the light shielding layer 46*b* is not limited to near the end of the transparent member layer 46.

In any of the examples shown in FIG. 16, the transparent member layer 46 is arranged on the light exit side of the display part 43F. However, the transparent member layer 46 may be arranged on the light exit side of the lens array 44F, and, for example, may be disposed between the lens array 44F and the display part 43F.

Also, in the case where the transparent member layer 46 is arranged on the light exit side of the display part 43F, the surface of the transparent member layer 46 from which light exits is exposed to the outside of the display switching device 11F. In such case, a coating for preventing the transparent member layer 46 from being damaged may be provided on the surface of the transparent member layer 46 on the side from which light exits.

<3.7>

In any of the configuration examples and modification examples described above, only the curved surfaces of the mean plane of the light incident surface 441 and the mean plane of the light exit surface 442 have been described. However, the display switching device according to the disclosure may have a mean plane that is not entirely curved.

Figure 17:
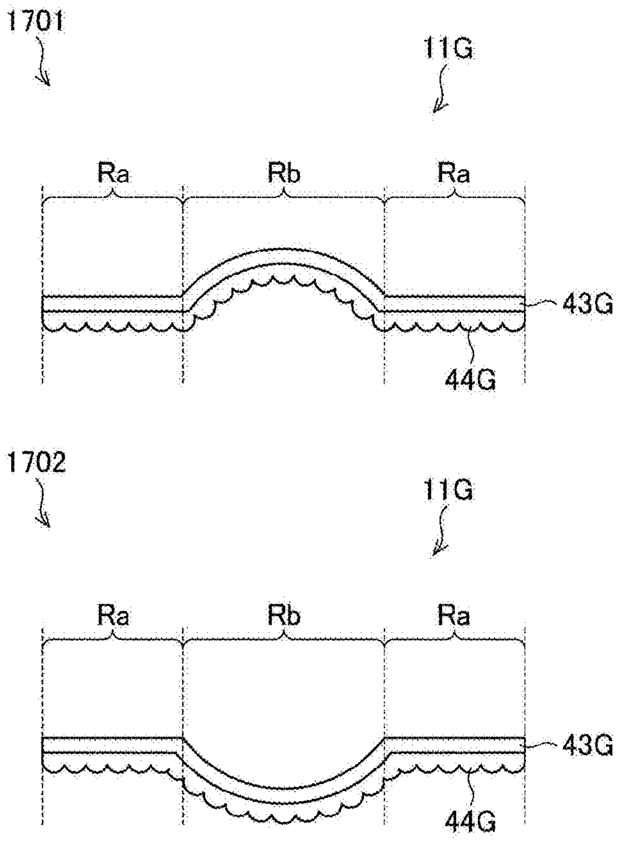
FIG. 17 is a diagram showing the configuration of main components of a display switching device according to a seventh modification example of the disclosure.

FIG. 17 is a diagram showing the configuration of main components of a display switching device 11G according to a seventh modification example of the disclosure. As shown in FIG. 17, the display switching device 11G includes a display part 43G and a lens array 44G. In FIG. 17, a reference numeral 1701 and a reference numeral 1702 show examples mutually different in the shape of the lens array 44G. Also, the display switching device 11G may further include the light absorption member 2, the light diffusion member 3, the display light condensation part 4, the light sources 5, and the substrate 6, similar to the display switching device 11. The display unit 43G has the same configuration as the display unit 43 except that the display unit 43G has a shape that follows the lens array 44G.

The lens array 44G has a planar region Ra and a curved region Rb. The planar region Ra is a region where the mean plane of the light incident surface 441 and the mean plane of the light exit surface 442 are planar. The curved region Rb is a region where the mean plane of the light incident surface 441 and the mean plane of the light exit surface 442 are curved. In the example shown by the reference numeral 1701 in FIG. 17, in the curved region Rb, the mean plane of the light incident surface 441 is concave, and the mean plane of the light exit surface 442 is convex. In the example shown by reference numeral 1702 in FIG. 17, in the curved region Rb, the mean plane of the light incident surface 441 is convex, and the mean plane of the light exit surface 442 is concave. In the example shown in FIG. 17, the curved region Rb is located near the center of the lens array 44G, and the planar region Ra is located outside the curved region Rb. With such display switching device 11G, display can be performed on a surface having a corresponding shape.

However, the positional relationship between the planar region Ra and the curved region Rb in the lens array 44G is not limited to the example shown in FIG. 17. For example, the planar region Ra may be located on one side of the lens array 44G, and the curved region Rb may be located on the other side. Also, the planar region Ra may be located near the center of the lens array 44G, and the curved region Rb may be located on the outer side of the planar region Ra.

<3.8>

The technical scope of the disclosure includes, in addition to the display switching devices according to the configuration examples and modification examples described above, a switch that includes the display switching device and detects a user's operation on the display switching device. Furthermore, the technical scope of the disclosure includes an electrical apparatus that includes the switch and operates according to the switch.

The disclosure is not limited to the embodiments described above, and various changes are possible within the range shown in the claims, and embodiments obtained by appropriately combining technical means disclosed in different embodiments are also included in the technical scope of the disclosure.

APPENDIX

The disclosure can also be expressed as follows.

A display switching device according to Aspect 1 of the disclosure switches a display image by switching irradiation of light from multiple light sources. The display switching device includes: a lens array, in which multiple lenses are arranged; and a display part. The display part includes multiple pixel regions, the pixel regions being disposed to comprise regions through which light condensed by each of the lenses of the lens array passes, a transmittance in each of the pixel regions is set to correspond to a predetermined static pattern, and in at least a portion of the lens array, a mean plane of a light incident surface and a mean plane of a light exit surface are curved surfaces, and (1) the curved surface of the mean plane of the light incident surface is concave, and the curved surface of the mean plane of the light exit surface is convex, or (2) the curved surface of the mean plane of the light incident surface is convex, and the curved surface of the mean plane of the light exit surface is concave.

According to the configuration, in the case where a curved surface is present in various devices or members, a display switching device that performs display on the curved portion can be provided. Therefore, the variations of devices and members in which the display switching device can be embedded can be significantly expanded.

Also, since the direction in which the surface is curved is the same for both the light incident surface and the light exit surface, the volume of the lens array can be reduced. Therefore, reduction in component cost and device weight can be achieved.

Regarding the display switching device according to Aspect 2 of the disclosure, in Aspect 1, in the curved surface of the mean plane of the light incident surface and the curved surface of the mean plane of the light exit surface, a curvature in a first direction is greater than 0, and a curvature in a second direction, which is different from the first direction, is 0.

According to the configuration, a display switching device that performs display on a surface having a curvature in only one direction can be provided.

Regarding the display switching device according to Aspect 3 of the disclosure, in Aspect 1 or 2, the curved surface of the mean plane of the light incident surface is concave, and the curved surface of the mean plane of the light exit surface is convex.

According to the configuration, since the curved surface of the mean plane of the light incident surface of the lens array is concave, the variation in distance between the light source and each position on the curved surface can be reduced. Therefore, it is possible to make the light condensation performance of each lens in the lens array more uniform, as well as to make the of light emitted from each lens more uniform.

Regarding the display switching device according to Aspect 4 of the disclosure, in any one of Aspects 1 to 3, the lens is formed on a side of the light incident surface, and a curvature of the curved surface of the mean plane of the light exit surface is greater than a curvature of the curved surface of the mean plane of the light incident surface.

In the case where the lens is formed on the light incident surface side, if the curvature of the curved surface of the mean plane of the light incident surface is made too large, there is a problem that it becomes difficult to remove the mold for the light incident surface in the case of forming the lens array by injection molding. Comparatively, according to the configuration, even in the case where it is desirable to increase the curvature of the curved surface of the mean plane of the light incident surface, it is possible to set the curvature of the curved surface of the mean plane of the light incident surface to a degree that allows for mold removal.

Regarding the display switching device according to Aspect 5 of the disclosure, in Aspect 1 or 2, the curved surface of the mean plane of the light incident surface is convex, and the curved surface of the mean plane of the light exit surface is concave.

According to the configuration, since the curved surface of the mean plane of the light exit surface of the lens array is concave, the variation in the distance between a user viewing the display switching device and each position on the curved surface can be reduced. Therefore, a display switching device can be provided in which display contents at any position of the display part are easily visible.

In addition, for example, considering the tactile sensation when pressing, a display switching device that performs display on the pressing surface can be provided for a push button having a concave-shaped pressing surface.

Regarding the display switching device according to Aspect 6 of the disclosure, in Aspect 1, in the curved surface of the mean plane of the light incident surface and the curved surface of the mean plane of the light exit surface, a curvature in a first direction is greater than 0, and a curvature in a second direction, which is different from the first direction, is also greater than 0.

According to the configuration, a display switching device that performs display on a surface having curvatures in two directions can be provided.

Regarding the display switching device according to Aspect 7 of the disclosure, in Aspect 1, the curved surface of the mean plane of the light exit surface comprises a portion of a spherical surface or an ellipsoidal surface.

According to the configuration, a display switching device that performs display on a spherical or ellipsoidal surface can be provided.

Regarding the display switching device according to Aspect 8 of the disclosure, in any one of Aspects 1 to 6, in the curved surface of the mean plane of the light exit surface, a curvature of an outer edge region disposed around a central region including a center of the curved surface is greater than a curvature of the central region.

According to the configuration, a display switching device can be provided that performs display on a surface such as a button shape, where the curvature is small in the central region and becomes larger in the outer edge region. Also, by having a greater curvature in the outer edge region, the amount of light emitted at a larger angle with respect to the direction of the optical axis of the light emitted from the curved surface can be increased. Therefore, the visibility from a wider viewing angle can be improved.

Regarding the display switching device according to Aspect 9 of the disclosure, in any one of Aspects 1 to 8, a transparent member layer formed by using a transparent material is provided on a light exit side of the lens array.

According to the configuration, since a transparent member layer having a curved surface shape of the light exit surface different from the curved surface shape of the light exit surface of the lens array can be provided, the degree of freedom of the curved surface shape of the light exit surface as a display switching device can be improved. Therefore, even in the case where there is an upper limit to the curvature of the curved surface of the light exit surface of the lens array due to structural reasons in lens formation, it becomes possible to provide a display switching device with a light exit surface having a larger curvature.

A switch according to Aspect 10 of the disclosure includes the display switching device according to any one of Aspects 1 to 9. The switch detects an operation of a user with respect to the display switching device.

According to the configuration, effects similar to those of the display switching device according to any of the above aspects can be achieved.

An electrical apparatus according to Aspect 11 of the disclosure includes the switch according to Aspect 10, where an operation is performed by the switch.

According to the configuration, effects similar to those of the switch can be achieved.

The invention claimed is:

1. A display switching device, switching a display image by switching irradiation of light from a plurality of light sources, the display switching device comprising:

a lens array, in which a plurality of lenses are arranged; and a display part, wherein the display part comprises a plurality of pixel regions, the pixel regions being disposed to comprise regions through which light condensed by each of the lenses of the lens array passes, a transmittance in each of the pixel regions is set to correspond to a predetermined static pattern, and in at least a portion of the lens array, a mean plane of a light incident surface and a mean plane of a light exit surface are curved surfaces, and (1) the curved surface of the mean plane of the light incident surface is concave, and the curved surface of the mean plane of the light exit surface is convex, or (2) the curved surface of the mean plane of the light incident surface is convex, and the curved surface of the mean plane of the light exit surface is concave.

2. The display switching device as claimed in claim 1, wherein, in the curved surface of the mean plane of the light incident surface and the curved surface of the mean plane of the light exit surface, a curvature in a first direction along the curved surface is greater than 0, and a curvature in a second direction along the curved surface, which is different from the first direction, is 0.

3. The display switching device as claimed in claim 2, wherein the curved surface of the mean plane of the light incident surface is concave, and the curved surface of the mean plane of the light exit surface is convex.

4. The display switching device as claimed in claim 3, wherein the lens is formed on a side of the light incident surface, and a curvature of the curved surface of the mean plane of the light exit surface is greater than a curvature of the curved surface of the mean plane of the light incident surface.

5. The display switching device as claimed in claim 2, wherein the curved surface of the mean plane of the light incident surface is convex, and the curved surface of the mean plane of the light exit surface is convex.

6. The display switching device as claimed in claim 1, wherein, in the curved surface of the mean plane of the light incident surface and the curved surface of the mean plane of the light exit surface, a curvature in a first direction along the curved surface is greater than 0, and a curvature in a second direction along the curved surface, which is different from the first direction, is also greater than 0.

7. The display switching device as claimed in claim 1, wherein the curved surface of the mean plane of the light exit surface comprises a portion of a spherical surface or an ellipsoidal surface.

8. The display switching device as claimed in claim 1, wherein, in the curved surface of the mean plane of the light exit surface, a curvature of an outer edge region disposed around a central region comprising a center of the curved surface is greater than a curvature of the central region.

9. The display switching device as claimed in claim 1, wherein a transparent member layer formed by using a transparent material is provided on a light exit side of the lens array.

10. A switch, comprising the display switching device as claimed in claim 1, and detecting an operation of a user with respect to the display switching device.

11. An electrical apparatus, comprising the switch as claimed in claim 10, wherein an operation is performed by the switch.

* * * * *